(12) United States Patent
Tsai et al.

(10) Patent No.: US 11,632,840 B2
(45) Date of Patent: Apr. 18, 2023

(54) LED DRIVING CIRCUIT AND METHOD

(71) Applicant: INDUSTRIAL TECHNOLOGY RESEARCH INSTITUTE, Hsinchu (TW)

(72) Inventors: Wen-Tien Tsai, Liuqiu Township (TW); Yu-Jen Chen, Cyonglin Township (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 65 days.

(21) Appl. No.: 17/230,557

(22) Filed: Apr. 14, 2021

(65) Prior Publication Data

US 2021/0385922 A1 Dec. 9, 2021

(30) Foreign Application Priority Data

Jun. 5, 2020 (TW) .................................. 109119029

(51) Int. Cl.
*H05B 45/30* (2020.01)
*H05B 45/3725* (2020.01)
*H02M 7/219* (2006.01)
*H02M 7/04* (2006.01)

(52) U.S. Cl.
CPC .......... *H05B 45/3725* (2020.01); *H02M 7/05* (2021.05); *H02M 7/219* (2013.01)

(58) Field of Classification Search
CPC ........ H05B 45/30; H05B 45/37; H05B 45/39; H05B 45/3725
See application file for complete search history.

(56) References Cited

U.S. PATENT DOCUMENTS

| | | | |
|---|---|---|---|
| 7,772,782 B2 * | 8/2010 | Chu | H05B 45/382 363/21.02 |
| 9,992,826 B1 | 6/2018 | Safaee | |
| 2010/0237799 A1 * | 9/2010 | Choi | H02M 3/285 315/294 |
| 2013/0119888 A1 * | 5/2013 | Elferich | H02M 1/4258 315/291 |

(Continued)

FOREIGN PATENT DOCUMENTS

| | | |
|---|---|---|
| CN | 101827481 B | 1/2013 |
| CN | 203289692 U | 11/2013 |

(Continued)

*Primary Examiner* — Tung X Le
(74) *Attorney, Agent, or Firm* — Birch, Stewart, Kolasch & Birch, LLP

(57) ABSTRACT

An the LED driving circuit, for driving an the LED load, includes: a bridge rectifier for rectifying an AC input voltage into a DC voltage; a serial capacitor voltage divider coupled to the bridge rectifier, including a plurality of serial capacitors; a half-bridge switch, coupled to the serial capacitor voltage divider; and a controller coupled to the half-bridge switch, for determining whether the DC voltage is higher than a threshold value and for controlling the half-bridge switch in a full-voltage mode or a half-voltage mode. In the full-voltage mode, the plurality of serial capacitors of the serial capacitor voltage divider synchronously supply power to the LED load. In the half-voltage mode, the plurality of serial capacitors of the serial capacitor voltage divider alternatively supply power to the LED load.

14 Claims, 10 Drawing Sheets

(56) References Cited

U.S. PATENT DOCUMENTS

| | | | | |
|---|---|---|---|---|
| 2013/0271021 A1* | 10/2013 | Elferich | ............... | H05B 45/382 |
| | | | | 315/206 |
| 2014/0009085 A1* | 1/2014 | Veskovic | .......... | H02M 3/33546 |
| | | | | 315/307 |
| 2015/0245431 A1* | 8/2015 | Rutgers | .............. | H05B 45/3725 |
| | | | | 315/210 |
| 2016/0073458 A1* | 3/2016 | Takahashi | ............. | F21V 23/009 |
| | | | | 315/291 |

FOREIGN PATENT DOCUMENTS

| | | |
|---|---|---|
| CN | 107801268 B | 11/2019 |
| CN | 111148319 A | 5/2020 |
| TW | 201334625 A1 | 8/2013 |
| TW | M489967 U | 11/2014 |
| TW | M507626 U | 8/2015 |
| TW | I508616 B | 11/2015 |
| TW | 201608930 A | 3/2016 |
| TW | I669982 B | 8/2019 |

\* cited by examiner

US 11,632,840 B2

1

LED DRIVING CIRCUIT AND METHOD

This application claims the benefit of Taiwan application Serial No. 109119029, filed Jun. 5, 2020, the disclosure of which is incorporated by reference herein in its entirety.

TECHNICAL FIELD

The disclosure relates in general to an LED driving circuit and method.

BACKGROUND

Light emitting diodes (LEDs), possessing the advantages of small volume, long life-span and excellent luminous efficiency, have become the mainstream product in the lighting market. Apart from the requirements of high efficiency, low cost, and small size, if the LED lighting power supply can further meet the requirement of wide range of AC voltage input, the application and design flexibility of the LED lighting product will also be increased.

The main architecture of the LED power supply includes a switching-mode power supply (SMPS) and a direct AC driver (DACD). The switching-mode power supply can meet the requirement of wide range of voltage input but is disadvantaged by the problems such as higher cost, larger volume, and electromagnetic interference. The direct AC driver has the advantages of lower cost and smaller volume and is free of electromagnetic interference, but still cannot meet the requirement of wide range of AC voltage input.

SUMMARY

According to one embodiment, an LED driving circuit for driving an LED load is provided. The LED driving circuit includes: a bridge rectifier configured to rectify an AC input voltage into a DC voltage; a serial capacitor voltage divider coupled to the bridge rectifier; a half-bridge switch coupled to the serial capacitor voltage divider; and a controller coupled to the half-bridge switch and configured to determine whether the DC voltage is higher than a threshold value. The serial capacitor voltage divider includes a plurality of capacitors connected in series. The controller controls the half-bridge switch to operate in a full-voltage mode or a half-voltage mode. In the full-voltage mode, the serial capacitors of the serial capacitor voltage divider synchronously supply power to the LED load; and, in the half-voltage mode, the serial capacitors of the serial capacitor voltage divider alternatively supply power to the LED load.

According to another embodiment, an LED driving method used in an LED driving circuit including a serial capacitor voltage divider is provided. The LED driving method includes: receiving an AC input voltage; rectifying the AC input voltage into a DC voltage; determining whether the DC voltage is higher than a threshold value; when it is determined that the DC voltage is lower than or equivalent to the threshold value, operating in a full-voltage mode to drive an LED load; when it is determined that the DC voltage is higher than the threshold value, dividing the DC voltage by a plurality of serial capacitors of the serial capacitor voltage divider, and operating in a half-voltage mode to drive the LED load.

The above and other aspects of the disclosure will become better understood with regard to the following detailed description of the preferred but non-limiting embodiment(s). The following description is made with reference to the accompanying drawings.

2

Figure 1:
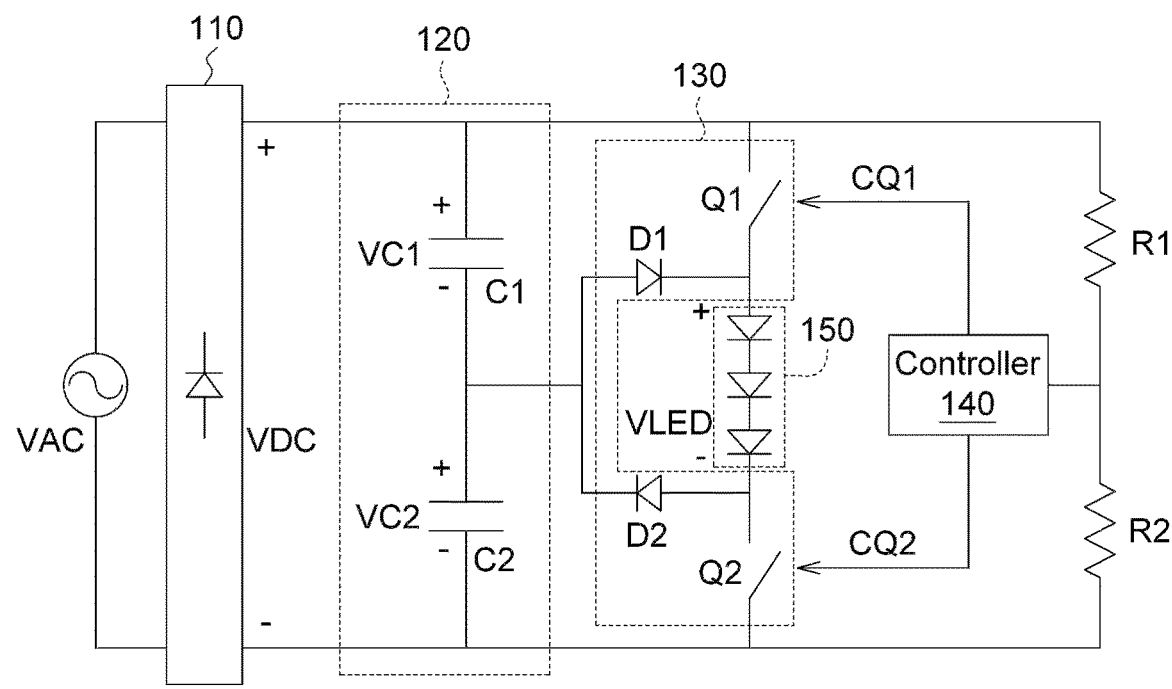
FIG. 1 is a functional block diagram of an LED driving circuit according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Technical terms are used in the specification with reference to generally-known terminologies used in the technology field. For any terms described or defined in the specification, the descriptions and definitions in the specification shall prevail. Each embodiment of the present disclosure has one or more technical features. Given that each embodiment is implementable, a person ordinarily skilled in the art can selectively implement or combine some or all of the technical features of any embodiment of the present disclosure.

Referring to FIG. 1, a functional block diagram of an LED driving circuit according to an embodiment of the present disclosure is shown. The LED driving circuit 100 is configured to drive the LED load 150. The LED driving circuit 100 includes a bridge rectifier 110, a serial capacitor voltage divider 120, a half-bridge switch 130, a controller 140, a first resistor R1, and second resistor R2.

The bridge rectifier 110 configured to rectify the AC input voltage VAC into a DC voltage VDC.

The serial capacitor voltage divider 120 is coupled to the bridge rectifier 110. In FIG. 1, the serial capacitor voltage divider 120 includes a first capacitor C1 and a second capacitor C2 connected in series. The cross-voltages of the first capacitor C1 and the second capacitor C2 respectively are the first capacitor cross-voltage VC1 and the second capacitor cross-voltage VC2.

The half-bridge switch 130 is coupled to the serial capacitor voltage divider 120. The half-bridge switch 130 includes a first switch Q1, a second switch Q2, a first diode D1 and a second diode D2. To put it in greater details, the first switch Q1 of the half-bridge switch 130 is coupled to the first capacitor C1 of the serial capacitor voltage divider 120, and the second switch Q2 is coupled to the second capacitor C2 of the serial capacitor voltage divider 120. The first switch Q1 and the second switch Q2 are respectively controlled by the first control signal CQ1 and the second control signal CQ2 outputted from the controller 140 to switch the conducting/non-conducting state of the first switch Q1 and the second switch Q2. The half-bridge switch 130 has two operating modes: a full-voltage mode and a half-voltage mode. When the AC input voltage VAC is 110V, the half-bridge switch 130 is operated in the full-voltage mode; when the AC input voltage VAC is 220V, the half-bridge switch 130 is operated in the half-voltage mode. The first diode D1 is coupled between one end of the first switch Q1 and a coupling point between the first capacitor C1 and the second capacitor C2. The second diode D2 is coupled between one end of the second switch Q2 and the coupling point between the first capacitor C1 and the second capacitor C2. The first diode D1 and the second diode D2 are respectively connected to the anode (+) and the cathode (−) of the LED load 150.

The controller 140 is coupled to the half-bridge switch 130, the first resistor R1 and the second resistor R2. The controller 140 estimates the DC voltage VDC according to the cross-voltage of the second resistor R2 to determine whether the AC input voltage VAC is 110V or 220V. Based on the result of determination, the controller 140 outputs the first control signal CQ1 and the second control signal CQ2 to control the first switch Q1 and the second switch Q2 of the half-bridge switch 130. Detailed descriptions are disclosed below.

Before the DC voltage VDC is detected, the first switch Q1 and the second switch Q2 of the half-bridge switch 130 both are in non-conducting state, therefore the DC voltage VDC is crossed on the first capacitor C1 and the second capacitor C2. The controller 140 detects the cross-voltage of the second resistor R2 and estimates the DC voltage VDC according to the ratio of the resistance of the first resistor R1 to that of the second resistor R2. If the DC voltage VDC is higher than the threshold value (includes but is not limited to 200V), then the controller 140 determines that the AC input voltage VAC is 220V. Conversely, if the DC voltage VDC is not higher than (that is, lower than or equivalent to) the threshold value, then the controller 140 determines that the AC input voltage VAC is 110V.

Figure 2:
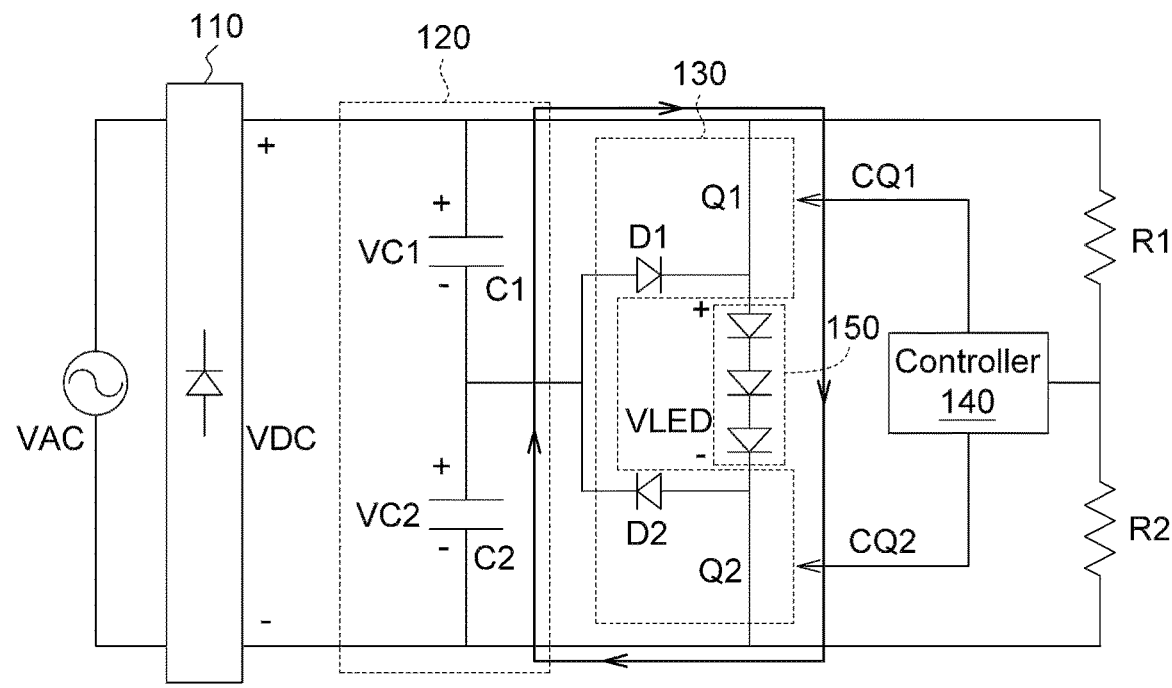
FIG. 2 is an operation diagram of the LED driving circuit of FIG. 1 operated in the full-voltage mode.

Referring to FIG. 2, an operation diagram of the LED driving circuit 100 of FIG. 1 operated in the full-voltage mode is shown. As indicated in FIG. 2, when the controller 140 determines that the AC input voltage VAC is 110V, the controller 140 controls the half-bridge switch 130 to be operated in the full-voltage mode. To put it in greater details, based on the result of determination, the controller 140 outputs the first control signal CQ1 and the second control signal CQ2 to respectively turn on the first switch Q1 and the second switch Q2 of the half-bridge switch 130 into the conducting state. As indicated in FIG. 2, when the first switch Q1 and the second switch Q2 of the half-bridge switch 130 both are turned on to the conducting state, the power stored on the first capacitor C1 and the second capacitor C2 flows to the first switch Q1, the LED load 150 and the second switch Q2 from the first capacitor C1 and the second capacitor C2. That is, in the full-voltage mode, the first capacitor C1 and the second capacitor C2 concurrently (synchronously) provide power to the LED load 150.

Figure 3A:
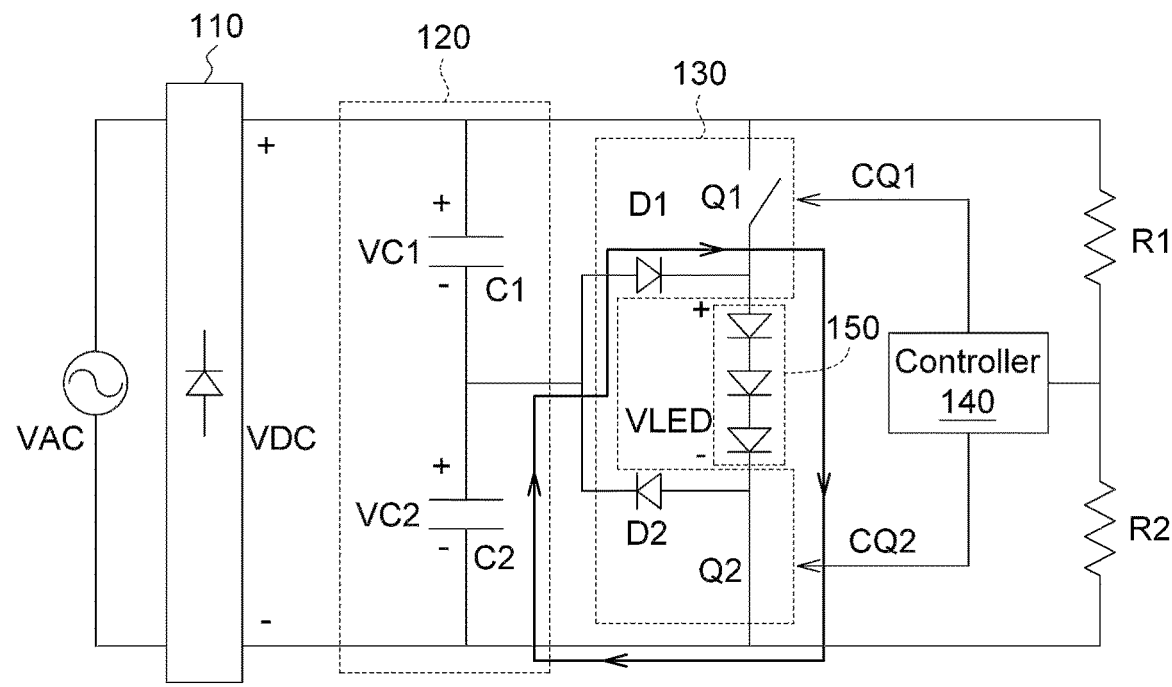
FIG. 3A and FIG. 3B are operation diagrams of the LED driving circuit of FIG. 1 operated in the half-voltage mode.
Figure 3B:
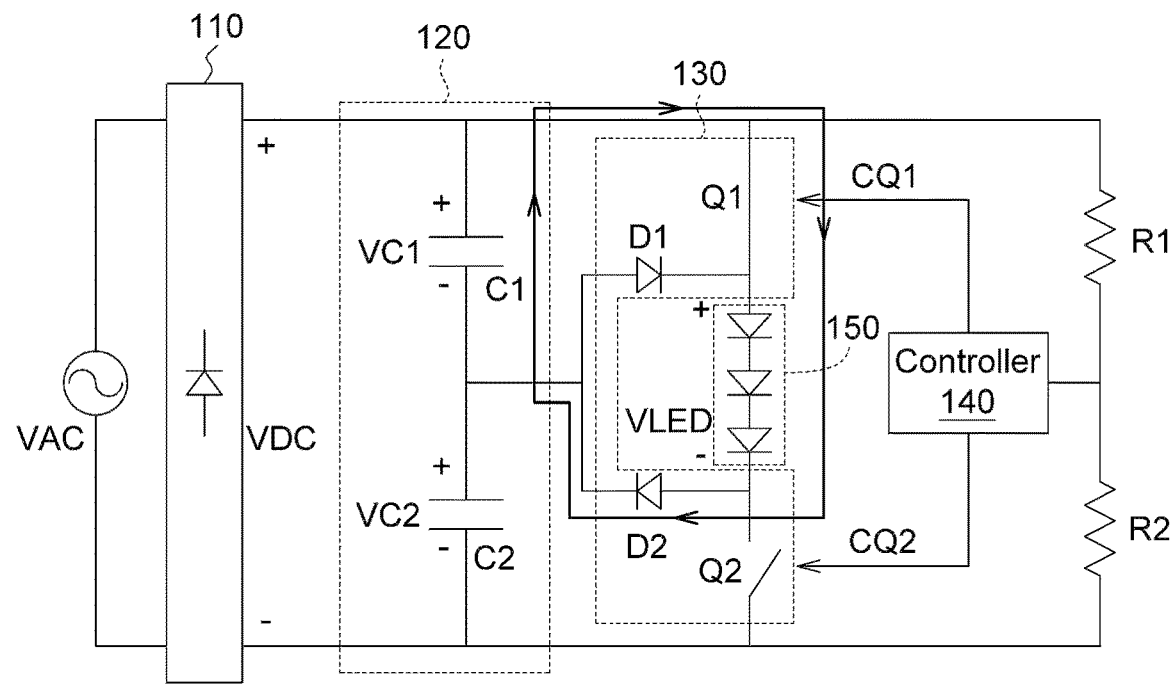

Referring to FIG. 3A and FIG. 3B, operation diagrams of the LED driving circuit 100 of FIG. 1 operated in the half-voltage mode are shown. As indicated in FIG. 3A and FIG. 3B, when the controller 140 determines that the AC input voltage VAC is 220V, the controller 140 controls the half-bridge switch 130 to be operated in the half-voltage mode. To put it in greater details, based on the result of determination, the controller 140 outputs the first control signal CQ1 and the second control signal CQ2 to respectively turn on and turn off the first switch Q1 and the second switch Q2 of the half-bridge switch 130 into the conducting state and the non-conducting state at different time points. That is, the first switch Q1 and the second switch Q2 are alternately turned on to the conducting state.

As indicated in FIG. 3A, when the second switch Q2 of the half-bridge switch 130 is turned on to the conducting state, the first switch Q1 is in the non-conducting state; meanwhile, power stored on the second capacitor C2 (that is, the second capacitor cross-voltage VC2) flows to the first diode D1, the LED load 150 and the second switch Q2 from the second capacitor C2.

As indicated in FIG. 3B, when the first switch Q1 of the half-bridge switch 130 is turned on to the conducting state, the second switch Q2 is in the non-conducting state; meanwhile, power stored on the first capacitor C1 (that is, the first capacitor cross-voltage VC1) flows to the first switch Q1, the LED load 150 and the second diode D2 from the first capacitor C1. That is, in the half-voltage mode, the first capacitor C1 and the second capacitor C2 alternatively supply power to the LED load 150.

Besides, in the half-voltage mode, the ratio of the conducting time of the first switch Q1 to that of the second switch Q2 relates to the ratio of the capacitance of the first capacitor C1 to that of the second capacitor C2. In an embodiment, when the ratio of the capacitance of the first capacitor C1 to that of the second capacitor C2 is A:B, the ratio of the conducting time of the first switch Q1 to that of the second switch Q2 is also A:B.

Through the above arrangement, the LED driving circuit 100 of FIG. 1 can drive the LED load 150 regardless of the AC input voltage VAC being 110V or 220V.

Figure 4:
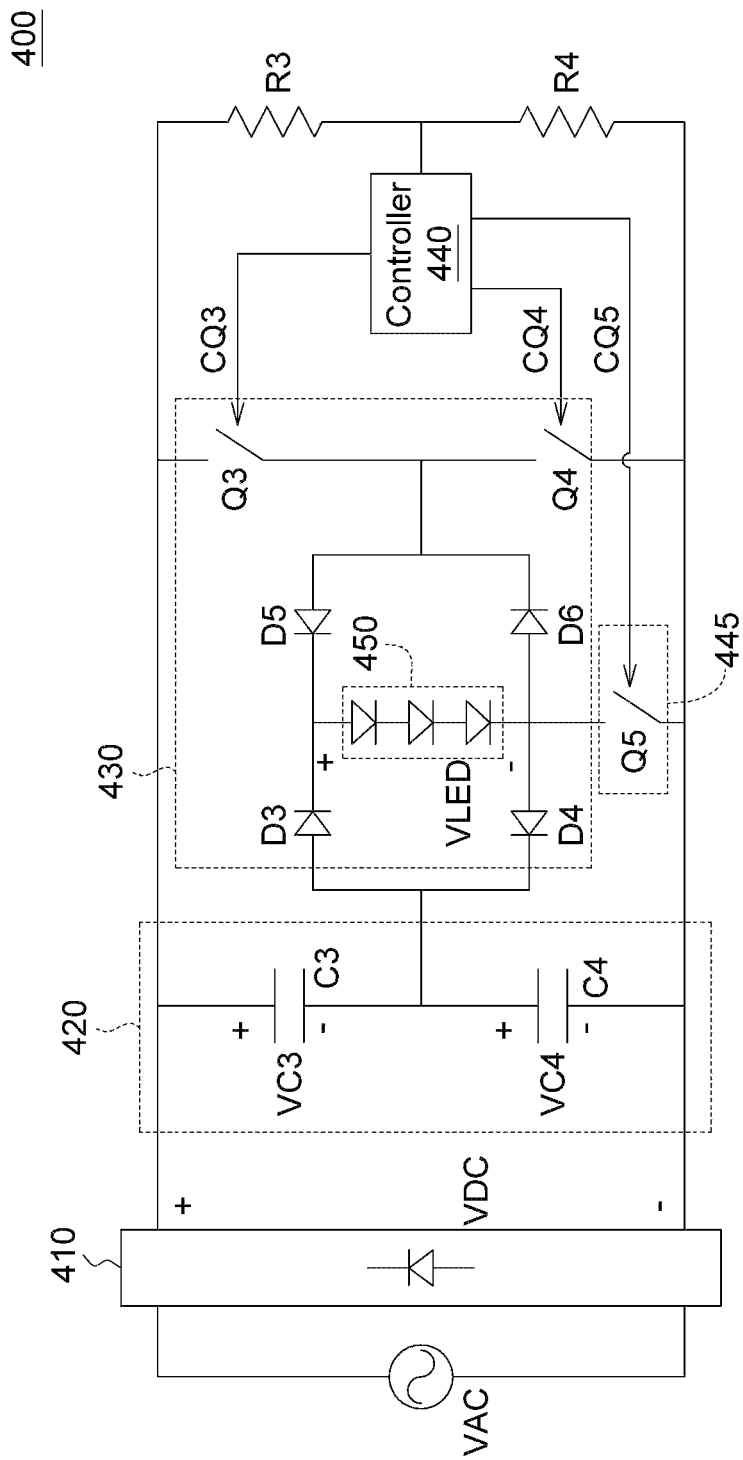
FIG. 4 is a functional block diagram of an LED driving circuit according to another embodiment of the present disclosure.

Referring to FIG. 4, a functional block diagram of an LED driving circuit according to another embodiment of the present disclosure is shown. The LED driving circuit 400 is configured to drive the LED load 450. The LED driving circuit 400 includes a bridge rectifier 410, a serial capacitor voltage divider 420, a half-bridge switch 430, a controller 440, a voltage mode switching circuit 445, a third resistor R3 and a fourth resistor R4.

The bridge rectifier 410 is configured to rectify the AC input voltage VAC into a DC voltage VDC. The serial capacitor voltage divider 420 is coupled to the bridge rectifier 410. In FIG. 4, the serial capacitor voltage divider 420 includes a third capacitor C3 and a fourth capacitor C4 connected in series, wherein, the cross-voltages of the third capacitor C3 and the fourth capacitor C4 respectively are the third capacitor cross-voltage VC3 and the fourth capacitor cross-voltage VC4.

The half-bridge switch 430 is coupled to the serial capacitor voltage divider 420. The half-bridge switch 430 includes a third switch Q3, a fourth switch Q4, and third to sixth diodes D3-D6. The third switch Q3 of the half-bridge switch 430 is coupled to the third capacitor C3 of the serial capacitor voltage divider 420. The fourth switch Q4 is coupled to the fourth capacitor C4 of the serial capacitor voltage divider 420. The third switch Q3 and the fourth switch Q4 are respectively controlled by the third control signal CQ3 and the fourth control signal CQ4 outputted from the controller 440 to switch the conducting/non-conducting state of the third switch Q3 and the fourth switch Q4. The half-bridge switch 430 has two operating modes: a full-voltage mode and a half-voltage mode. When the AC input voltage VAC is 110V, the half-bridge switch 430 is operated in the full-voltage mode; when the AC input voltage VAC is 220V, the half-bridge switch 430 is operated in the half-voltage mode.

The third diode D3 is coupled between the anode (+) of the LED load 450 and a coupling point between the third capacitor C3 and the fourth capacitor C4. The fourth diode D4 is coupled between the cathode (−) of the LED load 450 and the coupling point between the third capacitor C3 and the fourth capacitor C4. The fifth diode D5 is coupled between the anode (+) of the LED load 450 and a coupling point between the third switch Q3 and the fourth switch Q4. The sixth diode D6 is coupled between the cathode (−) of the LED load 450 and the coupling point between the third switch Q3 and the fourth switch Q4.

The controller 440 is coupled to the half-bridge switch 430, the third resistor R3, the fourth resistor R4 and the voltage mode switching circuit 445. The controller 440 estimates the DC voltage VDC according to the cross-voltage of the fourth resistor R4 to determine whether the AC input voltage VAC is 110V or 220V. Based on the result of determination, the controller 440 outputs the third to the fifth control signals CQ3-CQ5 to control the third switch Q3 of the half-bridge switch 430, the fourth switch Q4 and the voltage mode switching circuit 445. Detailed descriptions are disclosed below.

The voltage mode switching circuit 445 includes a fifth switch Q5 coupled between the LED load 450 and the controller 440.

Before the AC input voltage VAC is detected, the third to the fifth switches Q3-Q5 all are in non-conducting state, therefore the DC voltage VDC crosses the third capacitor C3 and the fourth capacitor C4. The controller 440 detects the cross-voltage on the fourth resistor R4 and estimates the DC voltage VDC according to the ratio of the resistance of the third resistor R3 to that of the fourth resistor R4. If the DC voltage VDC is higher than the threshold value (includes but is not limited to 200V), then the controller 440 determines that the AC input voltage VAC is 220V. Conversely, if the DC voltage VDC is lower than or equivalent to the threshold value, then the controller 440 determines that the AC input voltage VAC is 110V.

Figure 5:
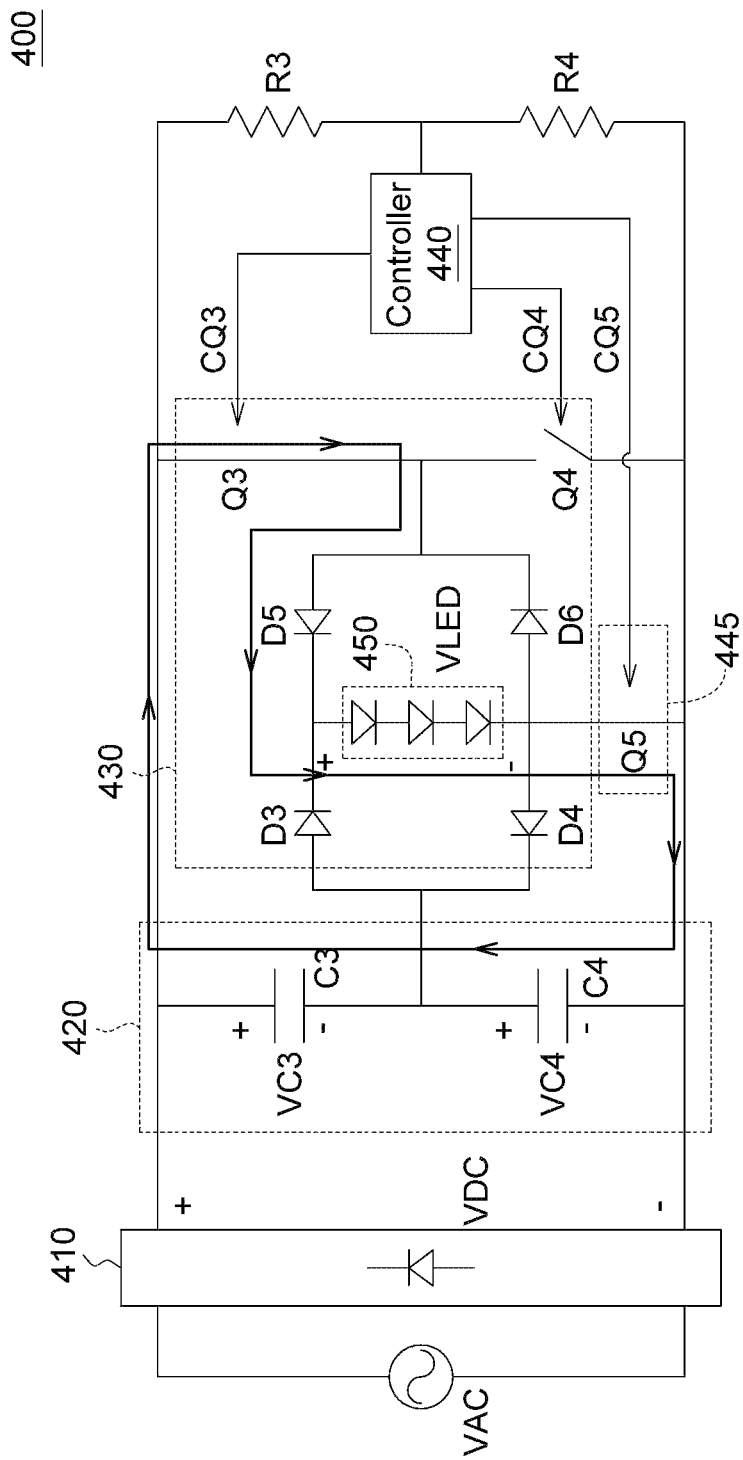
FIG. 5 is an operation diagram of the LED driving circuit of FIG. 4 operated in the full-voltage mode.

Referring to FIG. 5, an operation diagram of the LED driving circuit 400 of FIG. 4 operated in the full-voltage mode is shown. As indicated in FIG. 5, when the controller 440 determines that the AC input voltage VAC is 110V, the controller 440 controls the half-bridge switch 430 to be operated in the full-voltage mode; meanwhile, the controller 440 commands the fifth switch Q5 of the voltage mode switching circuit 445 to be turned on into conducting state. To put it in greater details, based on the result of determination, the controller 440 outputs the third to the fifth control signals CQ3-CQ5 to turn on the third to the fifth switches Q3-Q5 to conducting state, but turns off the fourth switch Q4 to non-conducting state. As indicated in FIG. 4, when the half-bridge switch 430 is operated in the full-voltage mode, the power stored on the third capacitor C3 and the fourth capacitor C4 all flows to the third switch Q3, the fifth diode D5, the LED load 450 and the fifth switch Q5 from the third capacitor C3 and the fourth capacitor C4. That is, in the full-voltage mode, the third capacitor C3 and the fourth capacitor C4 concurrently (synchronously) provide power to the LED load 450.

Figure 6A:
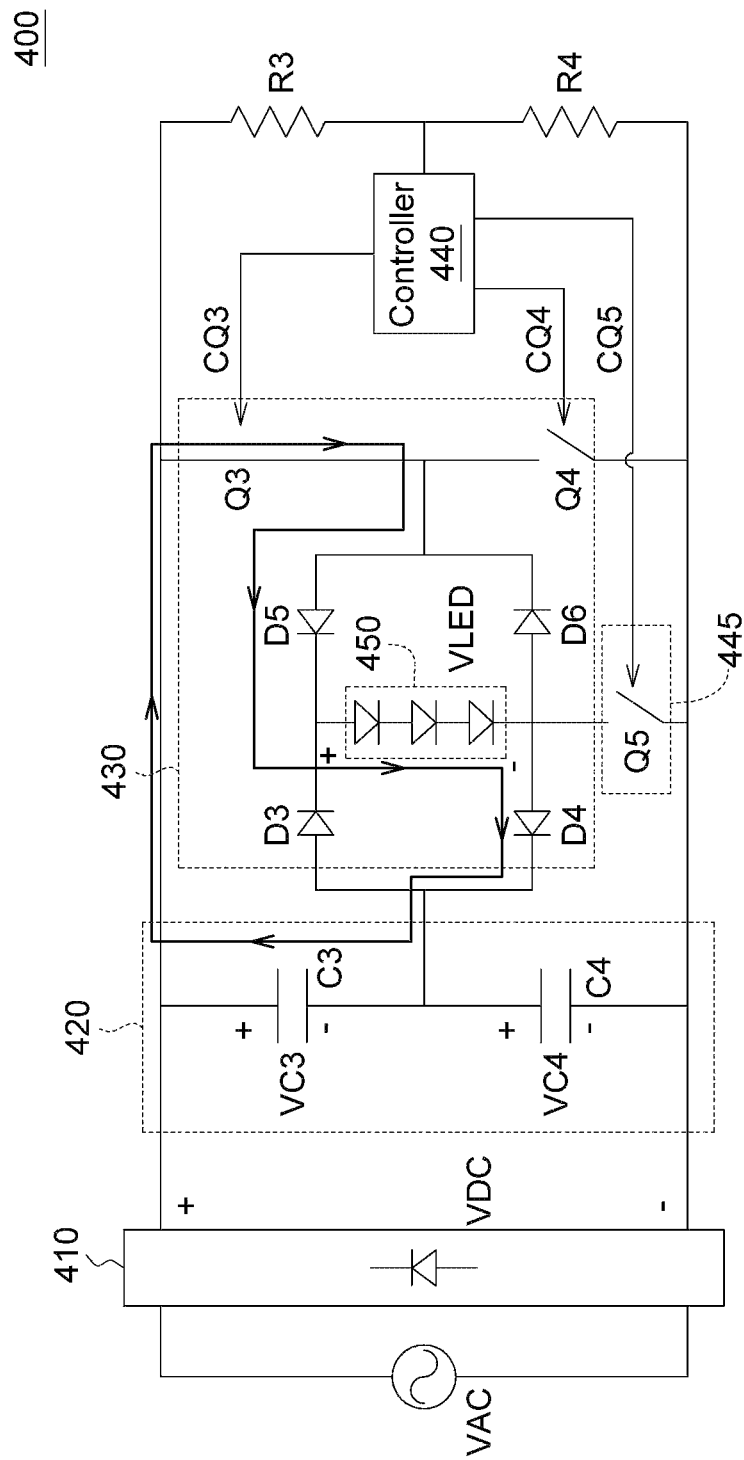
FIG. 6A and FIG. 6B are operation diagrams of the LED driving circuit of FIG. 4 operated in the half-voltage mode.
Figure 6B:
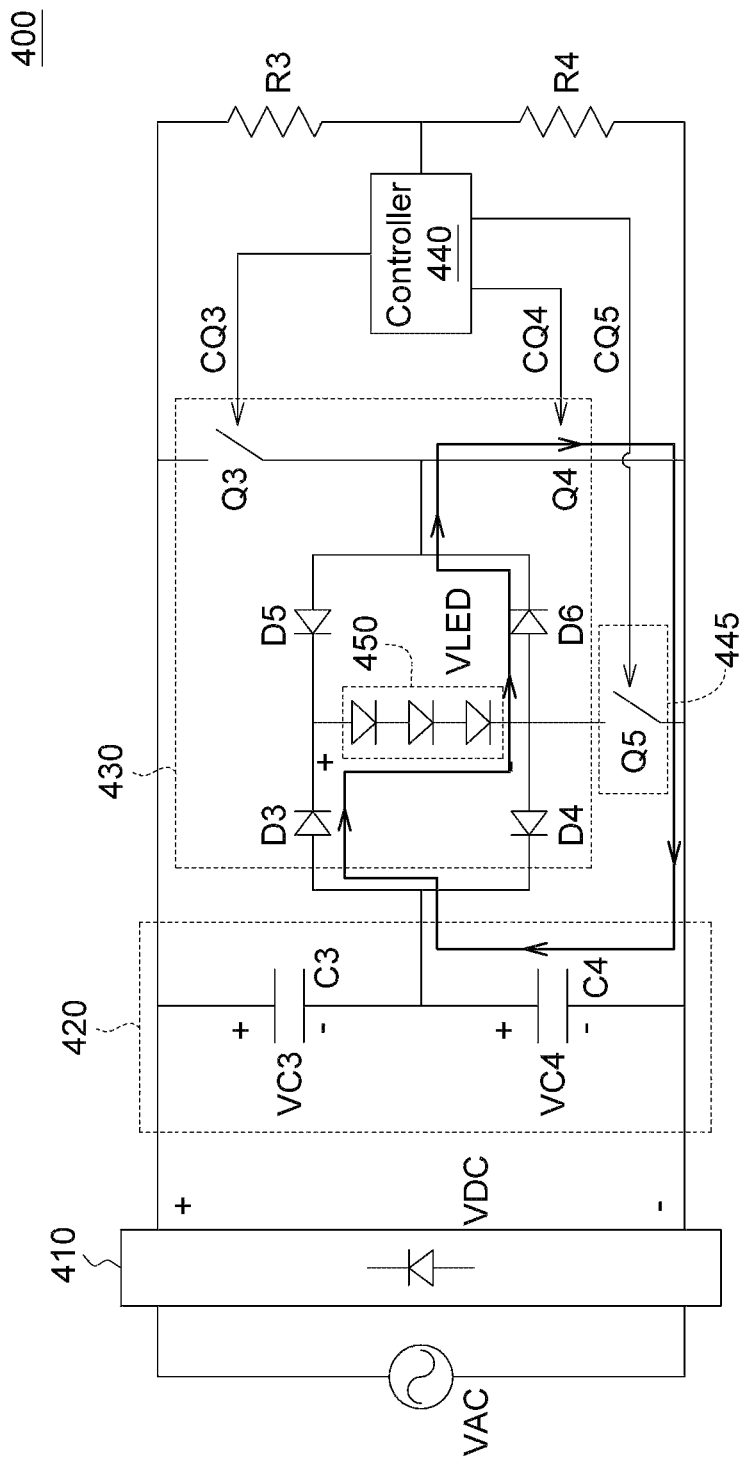

Referring to FIG. 6A and FIG. 6B, operation diagrams of the LED driving circuit 400 of FIG. 4 operated in the half-voltage mode are shown. As indicated in FIG. 6A and FIG. 6B, when the controller 440 determines that the AC input voltage VAC is 220V, the controller 440 controls the half-bridge switch 430 to be operated in the half-voltage mode; meanwhile, the controller 440 commands the fifth switch Q5 of the voltage mode switching circuit 445 to be turned off to non-conducting state. To put it in greater details, based on the result of determination, the controller 440 outputs the third to the fifth control signals CQ3-CQ5 to alternately turn on the third switch Q3 and the fourth switch Q4 to conducting state and maintain the fifth switch Q5 in the non-conducting state.

As indicated in FIG. 6A, in the half-voltage mode, when the third switch Q3 of the half-bridge switch 430 is turned on in conducting state, the fourth switch Q4 is in non-conducting state; meanwhile, power stored on the third capacitor C3 (that is, the third capacitor cross-voltage VC3) flows to the third switch Q3, the fifth diode D5, the LED load 450 and the fourth diode D4 from the third capacitor C3.

As indicated in FIG. 6B, in the half-voltage mode, when the fourth switch Q4 of the half-bridge switch 430 is turned on to conducting state, the third switch Q3 is in non-conducting state; meanwhile, power stored on the fourth capacitor C4 (that is, the fourth capacitor cross-voltage VC4) flows to the third diode D3, the LED load 450, the sixth diode D6 and the fourth switch Q4 from the fourth capacitor C4. That is, in the half-voltage mode, the third capacitor C3 and the fourth capacitor C4 alternatively supply power to the LED load 450.

Moreover, in the half-voltage mode, the ratio of the conducting time of the third switch Q3 to that of the fourth switch Q4 relates to the ratio of the capacitance of the third capacitor C3 to that of the fourth capacitor C4. In an embodiment, when the ratio of the capacitance of the third capacitor C3 to that of the fourth capacitor C4 is X:Y, the ratio of the conducting time of the third switch Q3 to that of the fourth switch Q4 is also X:Y.

Figure 7:
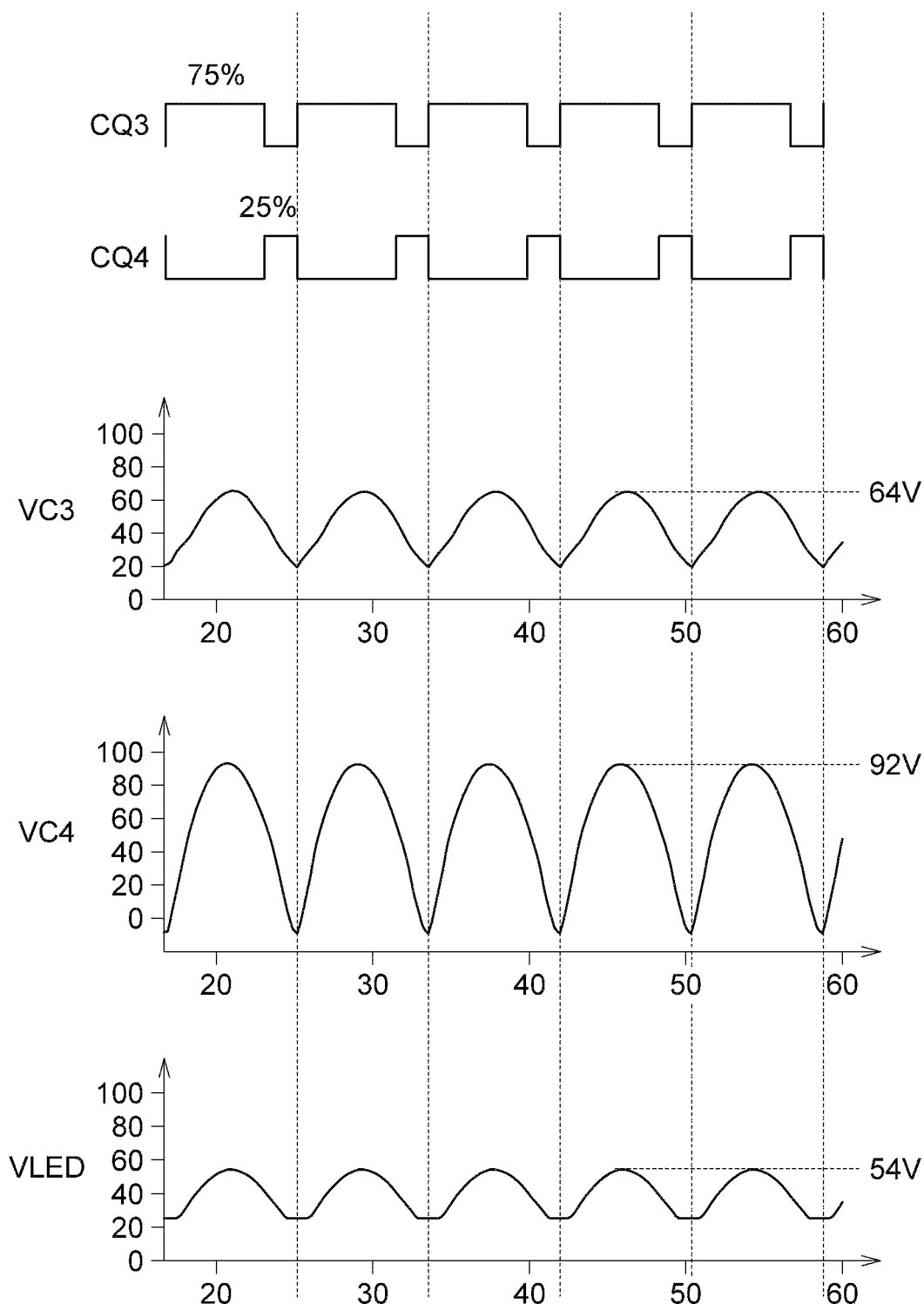
FIG. 7 to FIG. 9 are switch conducting rates and voltage waveforms of the LED driving circuit of FIG. 4.
Figure 8:
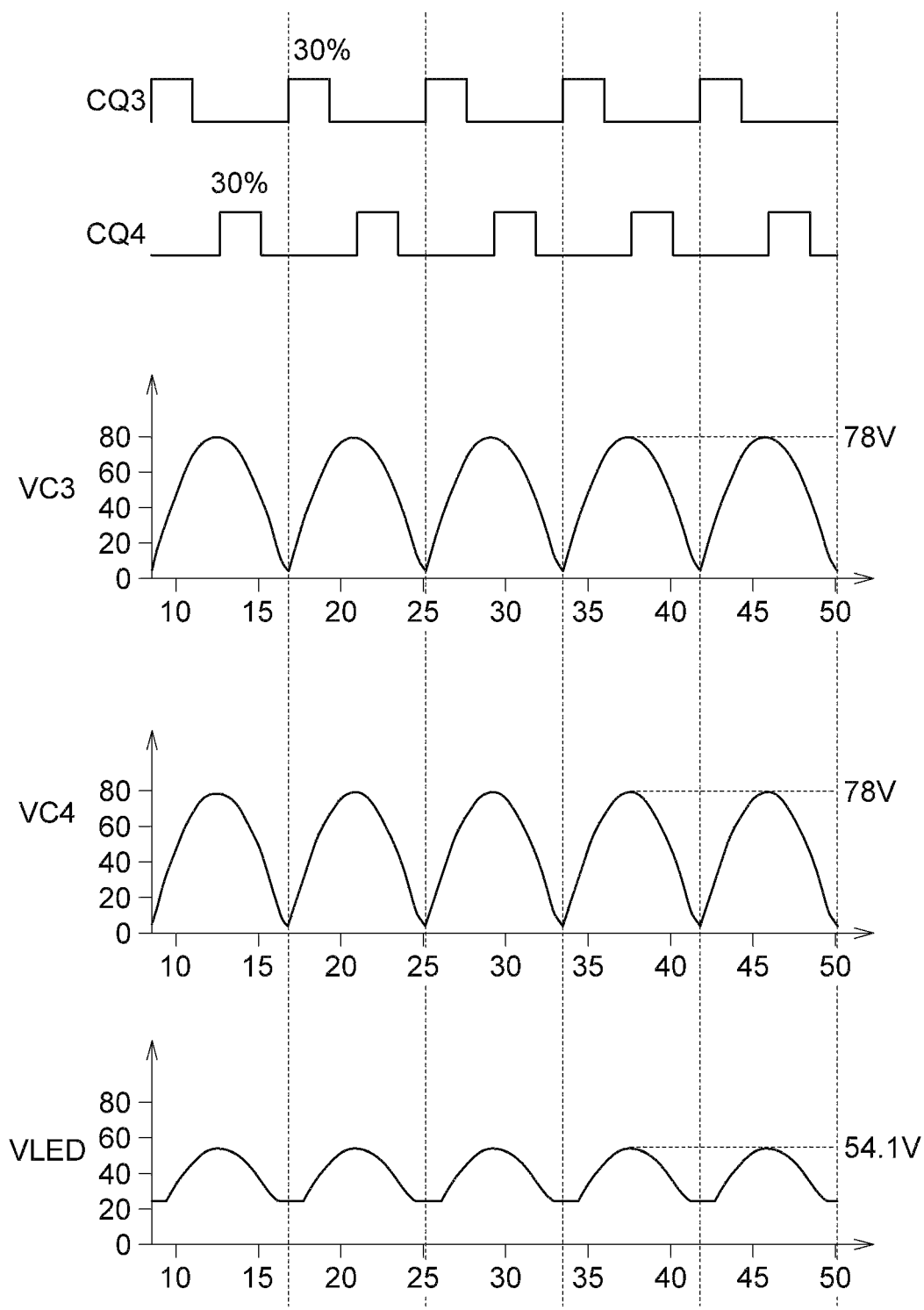
Figure 9:
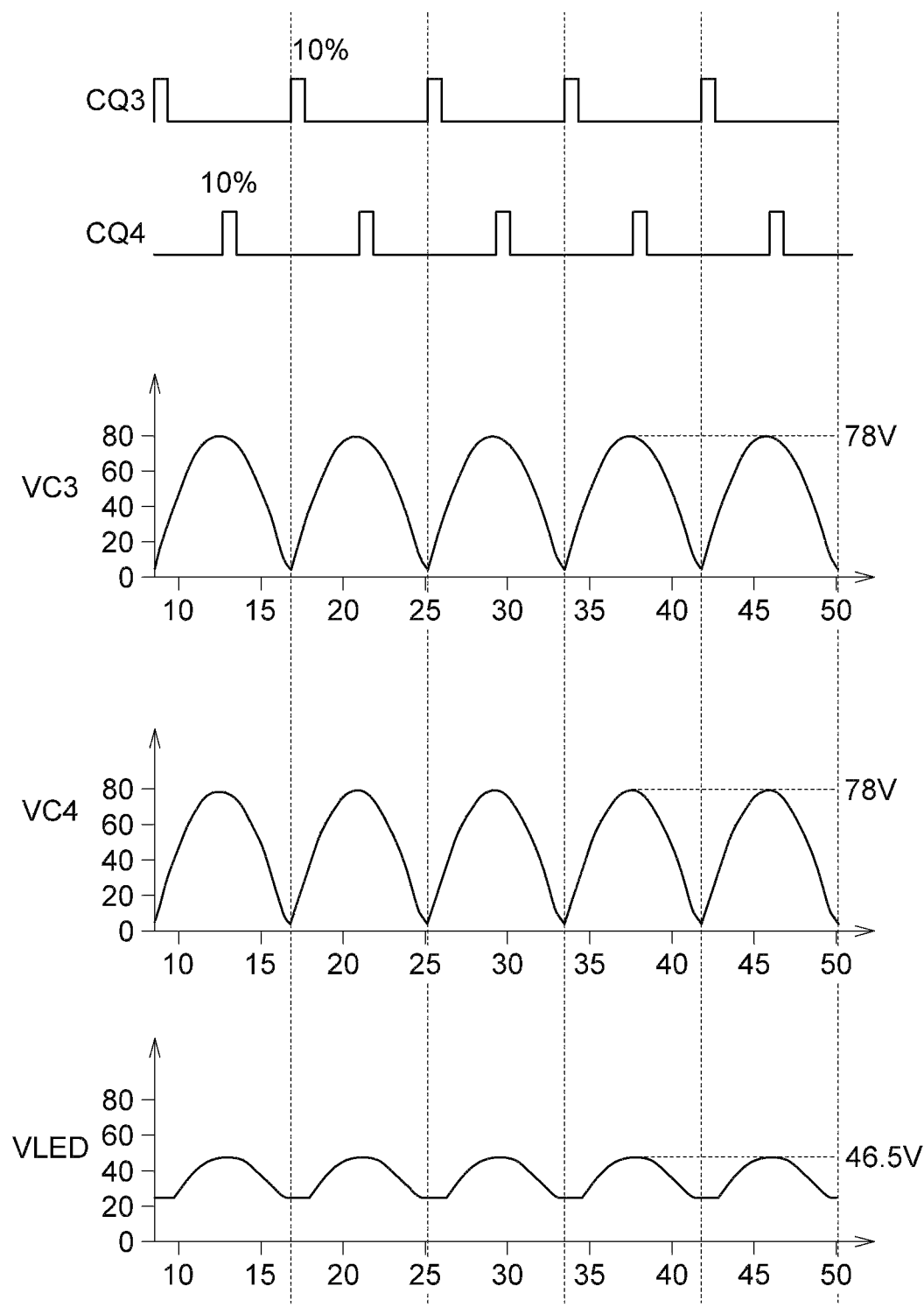

Referring to FIG. 7 to FIG. 9, conducting rates of the third switch Q3 and the fourth switch Q4 of the LED driving circuit 400 of FIG. 4 and voltage waveforms of the third capacitor cross-voltage VC3 of the third capacitor C3, the fourth capacitor cross-voltage VC4 of the fourth capacitor C4 and the LED load 450 are shown. It should be noted that although the said design is used in the LED driving circuit 400 of FIG. 4 as an exemplification, the design can obtain similar results when used in the LED driving circuit 100 of FIG. 1.

As indicated in FIG. 7, when the LED driving circuit 400 is in the half-voltage mode, the ratio of the capacitance of the third capacitor C3 to that of the fourth capacitor C4 is 3:1, and the rate of the conducting time of the third switch Q3 and that of the fourth switch Q4 respectively are 75% and 25%. Therefore, through the design of the third switch Q3 and the fourth switch Q4 being alternately turned on to conducting state to provide power, the cross-voltage VLED on the LED load 450 can maintain stable.

As indicated in FIG. 8, when the LED driving circuit 400 is in the half-voltage mode, the ratio of the capacitance of the third capacitor C3 to that of the fourth capacitor C4 is 1:1, the rate of the conducting time of the third switch Q3 and that of the fourth switch Q4 respectively are 30% and 30%. Therefore, through the design of the third switch Q3 and the fourth switch Q4 being alternately turned on to conducting state to provide power, the cross-voltage VLED on the LED load 450 can maintain stable.

As indicated in FIG. 9, when the LED driving circuit 400 is in the half-voltage mode, the ratio of the capacitance of the third capacitor C3 to that of the fourth capacitor C4 is 1:1, and the rate of the conducting time of the third switch Q3 and that of the fourth switch Q4 can respectively be designed to be 10% and 10%, and the phase shift is 180°. Therefore, through the design of the third switch Q3 and the fourth switch Q4 being alternately turned on to conducting state to provide power, the cross-voltage VLED of the LED load 450 can maintain stable.

Furthermore, in the present disclosed embodiment, if the rates of the conducting time of the third switch Q3 and the fourth switch Q4 (or the first switch Q1 and the second switch Q2 of FIG. 1) are reduced, the cross-voltage VLED of the LED load can be further reduced.

Through the above arrangement, both the LED driving circuit 100 of FIG. 1 and the LED driving circuit 400 of FIG. 4 can drive the LED loads 150 and 450 using an AC input voltage VAC regardless of being 110V or 220V.

Figure 10:
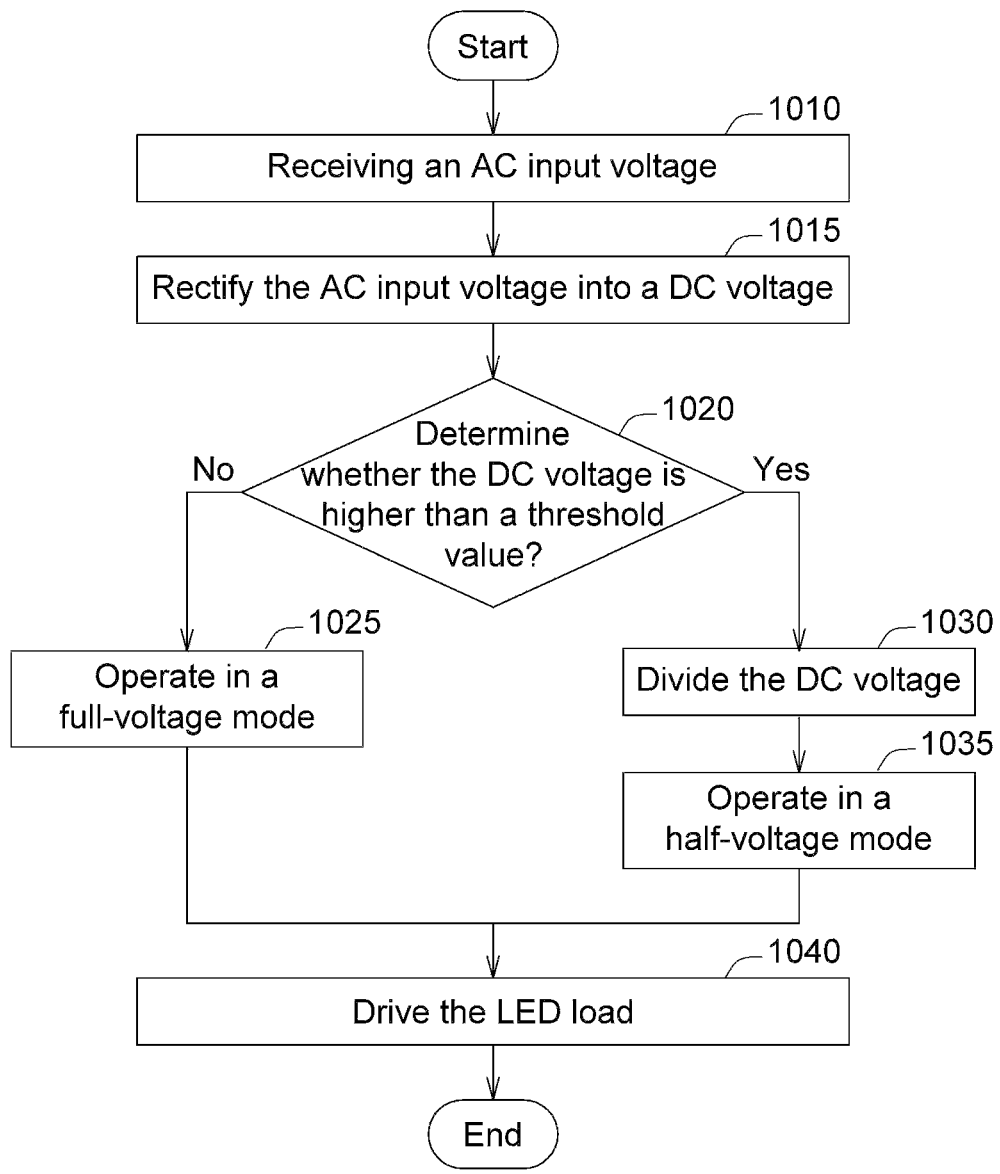
FIG. 10 is a flowchart of an LED driving method according to an embodiment of the present disclosure.

FIG. 10 is a flowchart of an LED driving method according to an embodiment of the present disclosure. In step 1010, an AC input voltage is received. In step 1015, the AC input voltage is rectified into a DC voltage. In step 1020, whether the DC voltage is higher than a threshold value is determined. If the determination in step 1020 is negative, then it is determined that the DC voltage is lower than or equivalent to the threshold value, and the method proceeds to step 1025, the method is operated in a full-voltage mode, and the LED load is driven in step 1040. If the determination in step 1020 is positive, it is determined that the DC voltage is higher than the threshold value, and the method proceeds to step 1030, the DC voltage is divided by the serial capacitors. Then, in step 1035, the method is operated in a half-voltage mode. In step 1040, the LED load is driven. The flowchart of FIG. 10 is also applicable to the LED driving circuit 100 of FIG. 1 and the LED driving circuit 400 of FIG. 4.

The LED driving circuit of the present disclosure can be realized by an AC driving circuit applicable to a wide range of voltage input. The LED driving circuit includes a bridge rectifier, a serial capacitor voltage divider, a controller, and a half-bridge switch. The bridge rectifier is configured to rectify an AC input voltage into a DC voltage. The serial capacitor voltage divider is configured to divide the DC voltage by the serial capacitors and enables each capacitor voltage to generate respective output voltages. The controller is configured to detect the DC voltage to output a control signal. The half-bridge switch includes a plurality of switches and a plurality of diodes coupled between the serial capacitor voltage divider and the LED load, and determines the path, through which the power provided by the capacitor provides power flows to the load, according to whether the diodes and the switches are in conducting state or not. Thus, the cross-voltage of the LED load can maintain the same regardless of the AC input voltage being a high input voltage or a low input voltage. Apart from the LED load, the present disclosure can also be used to drive a DC load such as a battery.

The LED driving circuit of the present disclosure includes two serial capacitors, coupled to the DC voltage (obtained by rectifying the AC input voltage), and enables each capacitor voltage to divide the rectified voltage. Besides, the half-bridge switch of the LED driving circuit can determine the timing and path through which the power provided by each capacitor flows to the LED load, such that the driving voltage of the LED can be the divided DC voltage or maintain the original DC voltage.

Thus, regardless of the AC input voltage being a high input voltage (such as 220V) or a low input voltage (such as 110V), the terminal voltage of the LED load can maintain the same, such that the quantity of LED grains can be effectively reduced and the load can be standardized, the utilization rate of the LED grains can be increased, the production cost can be reduced, and the problems of power efficiency and heat dissipation can be resolved.

Moreover, according to the embodiments of the present disclosure, the half-bridge switch can be complementarily switched at a phase shift of 180°, such that the two serial capacitors can alternately provide necessary power to drive the LED load. Thus, the serial capacitors can reduce voltage resistance of a capacitor. Besides, in the present disclosure, the switching frequency of the half-bridge switch can be set to be 10-100 times of the frequency of the AC mains. Thus, the serial capacitors (such as capacitors C1-C4) can be formed of multi-layer ceramic capacitors (MLCC) to effectively filter the waves, stabilize the voltage and achieve the advantages of small volume and long lifespan of power source.

When the LED driving circuit uses high input voltage as a power source, the present embodiment can resolve the problems encountered in the prior art such as poor power efficiency, excessive grains, poor dissipation and high cost.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An LED driving circuit for driving an LED load, the LED driving circuit comprising:
   a bridge rectifier configured to rectify an AC input voltage into a DC voltage;
   a serial capacitor voltage divider coupled to the bridge rectifier, wherein the serial capacitor voltage divider comprises a plurality of capacitors connected in series;
   a half-bridge switch coupled to the serial capacitor voltage divider; and
   a controller coupled to the half-bridge switch and configured to determine whether the DC voltage is higher than a threshold value, wherein the controller controls the half-bridge switch to operate in a full-voltage mode or a half-voltage mode,
   wherein, in the full-voltage mode, the plurality of capacitors of the serial capacitor voltage divider synchronously supply power to the LED load; and, in the half-voltage mode, the plurality of capacitors of the serial capacitor voltage divider alternatively supply power to the LED load;
   wherein when the controller determines whether the DC voltage is lower than or equivalent to the threshold value, the controller controls the half-bridge switch to operate in the full-voltage mode; and
   when the controller determines whether the DC voltage is higher than the threshold value, the controller controls the half-bridge switch to operate in the half-voltage mode.

2. The LED driving circuit according to claim 1, wherein, the half-bridge switch comprises a first switch and a second switch, the first switch is coupled to a first capacitor of the plurality of capacitors of the serial capacitor voltage divider, the second switch is coupled to a second capacitor of the plurality of capacitors of the serial capacitor voltage divider, and the first switch and the second switch are respectively controlled by the controller,
   before the DC voltage is detected, the first switch and the second switch both are turned off to a non-conducting state;
   in the full-voltage mode, the first switch and the second switch both are turned on to a conducting state; and
   in the half-voltage mode, the first switch and the second switch are alternately turned on to the conducting state.

3. The LED driving circuit according to claim 2, wherein, in the half-voltage mode, a ratio of a conducting time of the first switch and the second switch relates to a ratio of a capacitance of the first capacitor and the second capacitor.

4. The LED driving circuit according to claim 2, wherein, the half-bridge switch further comprises a first diode and a second diode, the first diode is coupled between one end of the first switch and a coupling point between the first capacitor and the second capacitor, the second diode is coupled between one end of the second switch and the coupling point between the first capacitor and the second capacitor, and the first diode and the second diode are respectively connected to an anode end and a cathode end of the LED load.

5. The LED driving circuit according to claim 1, further comprising a voltage mode switching circuit coupled between the LED load and the controller, in the full-voltage mode, the voltage mode switching circuit is turned on to a conducting state; and, in the half-voltage mode, the voltage mode switching circuit is turned off to a non-conducting state.

6. The LED driving circuit according to claim 5, wherein, the half-bridge switch comprises a third switch and a fourth switch, the third switch is coupled to a third capacitor of the plurality of capacitors of the serial capacitor voltage divider, the fourth switch is coupled to a fourth capacitor of the plurality of capacitors of the serial capacitor voltage divider, the voltage mode switching circuit comprises a fifth switch, and the third switch, the fourth switch and the fifth switch are respectively controlled by the controller,
before the DC voltage is detected, the third switch, the fourth switch and the fifth switch all are turned off to the non-conducting state;
in the full-voltage mode, the third switch and the fifth switch both are turned on to the conducting state, but the fourth switch is turned off to non-conducting state; and
in the half-voltage mode, the third switch and the fourth switch are alternately turned on to the conducting state, but the fifth switch is turned off to the non-conducting state.

7. The LED driving circuit according to claim 6, wherein, in the half-voltage mode, a ratio of a conducting time of the third switch and the fourth switch relates to a ratio of a capacitance of the third capacitor and the fourth capacitor.

8. The LED driving circuit according to claim 6, wherein, the half-bridge switch further comprises a third diode, a fourth diode, a fifth diode and a sixth diode, the third diode is coupled between an anode end of the LED load and a coupling point between the third capacitor and the fourth capacitor, the fourth diode is coupled between a cathode end of the LED load and the coupling point between the third capacitor and the fourth capacitor, the fifth diode is coupled between the anode end of the LED load and the coupling point between the third switch and the fourth switch, and the sixth diode is coupled between the cathode end of the LED load and the coupling point between the third switch and the fourth switch.

9. An LED driving method used in an LED driving circuit comprising a serial capacitor voltage divider, the LED driving method comprising:
receiving an AC input voltage;
rectifying the AC input voltage into a DC voltage;
determining whether the DC voltage is higher than a threshold value;
when the DC voltage is lower than or equivalent to the threshold value, operating in a full-voltage mode to drive an LED load;
when the DC voltage is higher than the threshold value, dividing the DC voltage by a plurality of serial capacitors of the serial capacitor voltage divider, and operating in a half-voltage mode to drive the LED load.

10. The LED driving method according to claim 9, wherein, in the full-voltage mode, the plurality of serial capacitors of the serial capacitor voltage divider synchronously supply power to the LED load; and, in the half-voltage mode, the plurality of serial capacitors of the serial capacitor voltage divider alternatively supply power to the LED load.

11. The LED driving method according to claim 9, wherein, the LED driving circuit further comprises a half-bridge switch, and in the half-voltage mode, a ratio of a conducting time of a first switch and a second switch of the half-bridge switch relates to a ratio of a capacitance of a first capacitor and a second capacitor of the plurality of serial capacitors of the serial capacitor voltage divider.

12. The LED driving method according to claim 9, wherein, the LED driving circuit further comprises a voltage mode switching circuit coupled to the LED load, in the full-voltage mode, the voltage mode switching circuit is turned on to a conducting state, and, in the half-voltage mode, the voltage mode switching circuit is turned off to a non-conducting state.

13. The LED driving method according to claim 12, wherein, the LED driving circuit further comprises a half-bridge switch, the half-bridge switch comprises a third switch and a fourth switch, the third switch is coupled to a third capacitor of the plurality of serial capacitors of the serial capacitor voltage divider, the fourth switch is coupled to a fourth capacitor of the plurality of serial capacitors of the serial capacitor voltage divider, and the voltage mode switching circuit comprises a fifth switch,
before the DC voltage is detected, the third switch, the fourth switch and the fifth switch all are turned off to the non-conducting state;
in the full-voltage mode, the third switch and the fifth switch both are turned on to the conducting state, but the fourth switch is turned off to the non-conducting state; and
in the half-voltage mode, the third switch and the fourth switch are alternately turned on to the conducting state, but the fifth switch is turned off to the non-conducting state.

14. The LED driving method according to claim 13, wherein, in the half-voltage mode, a ratio of a conducting time of the third switch and the fourth switch relates to a ratio of a capacitance of the third capacitor and the fourth capacitor.

* * * * *